US009793574B2

(12) United States Patent
Seino et al.

(10) Patent No.: US 9,793,574 B2
(45) Date of Patent: Oct. 17, 2017

(54) METHOD FOR PRODUCING SOLID ELECTROLYTE

(71) Applicant: IDEMITSU KOSAN CO., LTD., Chiyoda-ku (JP)

(72) Inventors: Yoshikatsu Seino, Sodegaura (JP); Takayoshi Kambara, Sodegaura (JP); Minoru Senga, Sodegaura (JP); Ryo Aburatani, Sodegaura (JP); Tadanori Junke, Sodegaura (JP); Masakatsu Kimura, Sodegaura (JP)

(73) Assignee: IDEMITSU KOSAN CO., LTD., Chiyoda-ku (JP)

( * ) Notice: Subject to any disclaimer, the term of this patent is extended or adjusted under 35 U.S.C. 154(b) by 35 days.

(21) Appl. No.: 14/786,808

(22) PCT Filed: Apr. 21, 2014

(86) PCT No.: PCT/JP2014/002238
§ 371 (c)(1),
(2) Date: Oct. 23, 2015

(87) PCT Pub. No.: WO2014/174829
PCT Pub. Date: Oct. 30, 2014

(65) Prior Publication Data
US 2016/0104916 A1    Apr. 14, 2016

(30) Foreign Application Priority Data

Apr. 24, 2013   (JP) .................................. 2013-091032
Sep. 13, 2013   (JP) .................................. 2013-191083

(51) Int. Cl.
*H01M 10/0562* (2010.01)
*H01B 1/10* (2006.01)
*C01B 17/22* (2006.01)
*H01M 10/0525* (2010.01)

(52) U.S. Cl.
CPC ......... *H01M 10/0562* (2013.01); *C01B 17/22* (2013.01); *H01B 1/10* (2013.01); *H01M 10/0525* (2013.01); *C01P 2002/72* (2013.01); *C01P 2004/64* (2013.01); *C01P 2006/12* (2013.01); *C01P 2006/14* (2013.01); *H01M 2220/20* (2013.01); *H01M 2220/30* (2013.01); *H01M 2300/0068* (2013.01)

(58) Field of Classification Search
CPC ......... H01M 10/0562; H01M 10/0525; H01M 2300/0068; H01M 2220/30; H01M 2220/20
See application file for complete search history.

(56) References Cited

U.S. PATENT DOCUMENTS

| 5,958,281 | A | 9/1999 | Takada et al. |
| 2007/0160911 | A1 | 7/2007 | Senga et al. |
| 2007/0196739 | A1 | 8/2007 | Seino et al. |
| 2010/0200795 | A1* | 8/2010 | Ota ..................... H01M 10/052 252/62.2 |
| 2013/0177821 | A1* | 7/2013 | Tsuchida ............... H01M 4/131 429/323 |
| 2014/0141339 | A1* | 5/2014 | Sugiura ............. H01M 10/0562 429/306 |

FOREIGN PATENT DOCUMENTS

| JP | 7-330312 A | 12/1995 | |
| JP | 9-283156 A | 10/1997 | |
| JP | 2005-228570 A | 8/2005 | |
| JP | 2010-163356 A | 7/2010 | |
| JP | 2011-84438 A | 4/2011 | |
| JP | 2011-136899 A | 7/2011 | |
| JP | 2012-48971 A | 3/2012 | |
| JP | WO 2012026561 A3 * | 5/2012 | ............ H01M 4/131 |
| JP | 2013-20894 A | 1/2013 | |
| WO | WO 2004/093099 A1 | 10/2004 | |
| WO | WO 2005/040039 A1 | 5/2005 | |
| WO | WO 2009/047977 A1 | 4/2009 | |

OTHER PUBLICATIONS

International Search Report issued Jun. 3, 2014 in PCT/JP2014/002238.
International Preliminary Report on Patentability and Written Opinion issued Oct. 27, 2015 in PCT/JP2014/002238 (English Translation only).
Zengcai Liu et al., "Anomalous High Ionic Conductivity of Nanoporous β-Li$_3$PS$_4$", Journal of American Chemical Society, Jan. 10, 2013, 5 pages.

* cited by examiner

*Primary Examiner* — Stewart Fraser
(74) *Attorney, Agent, or Firm* — Oblon, McClelland, Maier & Neustadt, L.L.P.

(57) ABSTRACT

A method for producing a solid electrolyte including step of bringing the following into contact with each other in a solvent having a solubility parameter of 9.0 or more: an alkali metal sulfide; one or two or more sulfur compounds selected from phosphorus sulfide, germanium sulfide, silicon sulfide and boron sulfide; and a halogen compound.

23 Claims, No Drawings

METHOD FOR PRODUCING SOLID ELECTROLYTE

TECHNICAL FIELD

The invention relates to a method for producing a sulfide-based solid electrolyte.

BACKGROUND ART

In recent years, there is an increasing demand for a lithium ion secondary battery used in mobile information terminals, mobile electronic devices, compact household power storage devices, motor cycles using a motor as a power source, electric cars, hybrid electric cars or the like.

As the method for ensuring safety of a lithium ion secondary battery, an all-solid secondary battery using an inorganic solid electrolyte instead of an organic electrolyte has been studied.

As a solid electrolyte for an all-solid secondary battery, a sulfide-based solid electrolyte obtained by using a sulfide as a raw material has been studied, for example. As the method for producing a sulfide-based solid electrolyte, for example, Patent Documents 1 and 2 disclose that a solid electrolyte is produced by reacting raw materials in N-methyl-2-pyrrolidone or carbon hydroxide. Further, Non-Patent Document 1 states that a solid electrolyte is produced by reacting lithium sulfide and phosphorus pentasulfide in tetrahydrofuran.

RELATED ART DOCUMENTS

Patent Documents

Patent Document 1: WO2004/093099
Patent Document 2: WO2009/047977

Non-Patent Document

Non-Patent Document 1: J. Am. Chem. Soc. 2013, 135, 975-978 "Anomalous High Ionic Conductivity of Nanoporous β-Li$_3$PS$_4$"

SUMMARY OF INVENTION

A solid electrolyte obtained by the production method disclosed in Patent Document 1, specifically, by a production method of a solid electrolyte in which raw materials are reacted in N-methyl-2-pyrrolidone, tends to have a low ionic conductivity.

In the production method of a solid electrolyte disclosed in Patent Document 2, specifically, in a method for producing a solid electrolyte in which raw materials are reacted in hydrocarbon, when a mixing and grinding apparatus such as a mill is not used, Li$_2$S or the like as a raw material may remain.

The solid electrolyte obtained in the Non-Patent Document 1 mentioned above has a low ionic conductivity.

The invention has been made taking the above-mentioned problem into consideration, and is aimed at providing a production method that can produce a solid electrolyte in which Li$_2$S or the like as raw materials do not remain even when an apparatus such as a mill is not used and exhibits a sufficient ionic conductivity.

According to the invention, the following method for producing a solid electrolyte can be provided.

1. A method for producing a solid electrolyte comprising a step of bringing the following into contact with each other in a solvent having a solubility parameter of 9.0 or more:
    an alkali metal sulfide;
    one or two or more sulfur compounds selected from phosphorus sulfide, germanium sulfide, silicon sulfide and boron sulfide; and a halogen compound.
2. The method for producing a solid electrolyte according to 1, wherein the solvent is ether.
3. The method for producing a solid electrolyte according to 1 or 2, wherein the solvent is cyclic ether.
4. The method for producing a solid electrolyte according to 1 or 2, wherein the boiling point of the solvent is 65 to 200° C.
5. The method for producing a solid electrolyte according to any one of 1 to 4, wherein the solvent is tetrahydrofuran.
6. A method for producing a solid electrolyte comprising a step of bringing the following into contact with each other in tetrahydrofuran:
    an alkali metal sulfide;
    one or two or more sulfur compounds selected from phosphorus sulfide, germanium sulfide, silicon sulfide and boron sulfide; and a halogen compound.
7. The method for producing a solid electrolyte according to any one of 1 to 6, wherein the alkali metal sulfide has a particle size of 100 μm or less.
8. The method for producing a solid electrolyte according to any one of 1 to 6, wherein the particle size of the alkali metal sulfide exceeds 100 μm.
9. The method for producing a solid electrolyte according to any one of 1 to 8, wherein the alkali metal sulfide is lithium sulfide (Li$_2$S).
10. The method for producing a solid electrolyte according to any one of 1 to 9, wherein the sulfur compound is phosphorus sulfide.
11. The method for producing a solid electrolyte according to any one of 1 to 10, wherein the sulfur compound is phosphorus pentasulfide (P$_2$S$_5$).
12. The method for producing a solid electrolyte according to any one of 1 to 11, wherein the alkali metal sulfide is lithium sulfide (Li$_2$S) and the sulfur compound is phosphorus pentasulfide (P$_2$S$_5$), and the mixing ratio of Li$_2$S and P$_2$S$_5$ (Li$_2$S:P$_2$S$_5$) is 68:32 to 80:20 in terms of molar ratio.
13. The method for producing a solid electrolyte according to 12, wherein the mixing ratio of Li$_2$S and P$_2$S$_5$ is 74:26 to 76:24 in terms of molar ratio.
14. The method for producing a solid electrolyte according to any one of 1 to 13, wherein the halogen compound is a bromine compound.
15. The method for producing a solid electrolyte according to any one of 1 to 14, wherein the halogen compound is LiBr or PBr$_3$.
16. The method for producing a solid electrolyte according to any one of 1 to 15, wherein the temperature of the contact is 20 to 200° C.
17. The method for producing a solid electrolyte according to any one of 1 to 16, wherein the time of the contact is 1 to 40 hours.
18. The method for producing a solid electrolyte according to any one of 1 to 17, wherein an alkali metal sulfide that is not subjected to modification is used as the alkali metal sulfide.
19. The method for producing a solid electrolyte according to 18, wherein the modification is conducted to increase the specific surface area of the alkali metal sulfide by using a solvent including a polar solvent.

According to the invention, a solid electrolyte can be produced without using a special apparatus such as a mill.

MODE FOR CARRYING OUT THE INVENTION

The method for producing a solid electrolyte according to the invention comprises a step of bringing into contact the following raw materials (A) to (C) in a solvent having a solubility parameter of 9.0 or more.
(A) Alkali Metal Sulfide
(B) One or two or more sulfur compounds selected from phosphorus sulfide, germanium sulfide, silicon sulfide and boron sulfide
(C) Halogen Compound
(A) Alkali Metal Sulfide As the alkali metal sulfide, $Li_2S$ (lithium sulfide) and $Na_2S$ (sodium sulfide) can be given. Among these, lithium sulfide is preferable.

Although lithium sulfide is not particularly restricted, one having a high purity is preferable. Lithium sulfide can be produced by methods described in JP-A-H07-330312, JP-A-H09-283156, JP-A-2010-163356, JP-A-2011-084438 and JPA-2011-136899.

Specifically, lithium sulfide can be synthesized by reacting lithium hydroxide and hydrogen sulfide in a hydrocarbon-based organic solvent at 70° C. to 300° C. to form lithium hydrosulfide, and by subjecting this reaction liquid to dehydrogen sulfide (JP-A-2010-163356).

In addition, lithium sulfide can be synthesized by reacting lithium hydroxide and hydrogen sulfide in a water solvent at 10° C. to 100° C. to form lithium hydroxide, and by subjecting this reaction liquid to dehydrogen sulfide (JP-A-2011-084438).

As for the lithium sulfide, the total content of lithium salts of a sulfur oxide is preferably 0.15 mass % or less, more preferably 0.1 mass % or less, and the content of lithium N-methylaminobutyrate is preferably 0.15 mass % or less, more preferably 0.1 mass % or less. If the total content of lithium salts of the sulfur oxide is 0.15 mass % or less, a solid electrolyte obtained by a melt quenching method or by a mechanical milling method is a glassy electrolyte (completely amorphous). On the other hand, if the total content of lithium salts of a sulfur oxide exceeds 0.15 mass %, the resulting electrolyte may become crystalline from the beginning.

If the content of lithium N-methylaminobutyrate is 0.15 mass % or less, there is no fear that a deteriorated product of lithium N-methylaminobutyrate lowers the cycle performance of a lithium ion battery. By using lithium sulfide of which the amount of impurities is decreased, a highly ionically conductive electrolyte can be obtained.

When lithium sulfide is produced based on the above-mentioned JP-A-H07-330312 and JP-A-H09-283156, it is preferable to conduct purification since lithium sulfide comprises lithium salts of a sulfur oxide or the like.

Lithium sulfide produced by a method for producing lithium sulfide described in JP-A-2010-163356 has a significantly small content of lithium salts of a sulfur oxide, and hence may be used without purification.

As the preferable purification method, a purification method disclosed in WO2005/40039 or the like can be mentioned. Specifically, lithium sulfide obtained by the method mentioned above is washed with an organic solvent at a temperature of 100° C. or higher.

In respect of further accelerating the reaction speed, it is preferable to use lithium sulfide disclosed in JP-A-2011-136899. By modifying lithium sulfide by using a solvent including a polar solvent, it is possible to prepare lithium sulfide having a large specific surface area.

However, in the invention, by conducting a reaction in a specific solvent, the reaction can be proceeded easily without the above-mentioned modification.

Therefore, in respect of reducing the production steps, it is preferable not to conduct the above-mentioned modification. Conducting no modification is particularly effective when merits obtained therefrom in respect of production cost are larger than further increasing in the reaction speed.

In respect of further increasing the reaction speed, the particle size of alkali metal sulfide particles used as a raw material is preferably 100 μm or less, more preferably 80 μm or less, with 50 μm or less being further preferable.

However, in the invention, since the reaction can be proceeded readily by reacting in a specific solvent, the particle size of the alkali metal sulfide particles used as the raw material may exceed 100 μm. This is particularly effective when merits obtained from reducing the step of decreasing the particle size of the alkali metal sulfide particles are large in respect of production cost The particle size of the alkali metal sulfide particles is measured by the LASER diffraction method by means of Mastersizer 2000 (manufactured by Malvern Instruments Ltd.) and calculated from the volume based average particle diameter. It is preferred that the measurement be conducted directly in the state of a slurry without conducting drying. The reason is that, if conducting drying once, aggregation of particles occurs at the time of drying, leading to a large apparent particle size. Further, it is preferred that the alkali metal sulfide particles have a fine pore volume of 0.01 ml/g or more. If the fine pore volume is 0.01 ml/g or more, the alkali metal sulfide particles tend to be reacted easily with other raw materials than the alkali metal sulfide particles, and in addition, the alkali metal sulfide particles tend to be pulverized easily and can be reacted more easily.
(B) Sulfur Compound As the raw material (B), phosphorus sulfide such as $P_2S_3$ (phosphorus trisulfide), $P_2S_5$ (phosphorus pentasulfide), $SiS_2$ (silicon sulfide), $Al_2S_3$ (aluminum sulfide), $GeS_2$ (germanium sulfide), $B_2S_3$ (arsenic trisulfide) or the like can be used. Phosphorus sulfide is preferable, with $P_2S_5$ being particularly preferable. The raw materials (B) may be used in a mixture of two or more.

No specific restrictions are imposed on $P_2S_5$ as long as it is produced and sold on the industrial basis.
(C) Halide As the halide, LiF, LiCl, LiBr, LiI, $BCl_3$, $BBr_3$, $BI_3$, $AlF_3$, $AlBr_3$, $AlI_3$, $AlCl_3$, $SiF_4$, $SiCl_4$, $SiCl_3$, $Si_2Cl_6$, $SiBr_4$, $SiBrCl_3$, $SiBr_2Cl_2$, $SiI_4$, $PF_3$, $PF_5$, $PCl_3$, $PCl_5$, $PBr_3$, $PI_3$, $P_2Cl_4$, $P_2I_4$, $SF_2$, $SF_4$, $SF_6$, $S_2F_{10}$, $SCl_2$, $S_2Cl_2$, $S_2Br_2$, $GeF_4$, $GeCl_4$, $GeBr_4$, $GeI_4$, $GeF_2$, $GeCl_2$, $GeBr_2$, $GeI_2$, $AsF_3$, $AsCl_3$, $AsBr_3$, $AsI_3$, $AsF_5$, $SeF_4$, $SeF_6$, $SeCl_2$, $SeCl_4$, $Se_2Br_2$, $SeBr_4$, $SnF_4$, $SnCl_4$, $SnBr_4$, $SnI_4$, $SnF_2$, $SnCl_2$, $SnBr_2$, $SnI_2$, $SbF_3$, $SbCl_3$, $SbBr_3$, $SbI_3$, $SbF_5$, $SbCl_5$, $PbF_4$, $PbCl_4$, $PbF_2$, $PbCl_2$, $PbBr_2$, $PbI_2$, $BiF_3$, $BiCl_3$, $BiBr_3$, $BiI_3$, $TeF_4$, $Te_2F_{10}$, $TeF_6$, $TeCl_2$, $TeCl_4$, $TeBr_2$, $TeBr_4$, $TeI_4$, NaI, NaF, NaCl, NaBr or the like can be given. A compound of lithium or phosphorus is preferable. Further, a bromine compound is preferable. Specifically, LiCl, LiBr, LiI, $PCl_5$, $PCl_3$, $PBr_5$ and $PBr_3$ are preferable, more preferably LiCl, LiBr, LiI and $PBr_3$, with LiBr and $PBr_3$ being particularly preferable.

In addition to the above-mentioned raw materials (A) to (C), a compound that lowers the glass transition temperature (vitrification accelerator) may be added as the raw material (D). As examples of the vitrification accelerator, inorganic compounds such as $Li_3PO_4$, $Li_4SiO_4$, $Li_4GeO_4$, $Li_3BO_3$, $Li_3AlO_3$, $Li_3CaO_3$, $Li_3InO_3$, $Na_3PO_4$, $Na_4SiO_4$, $Na_4GeO_4$, $Na_3BO_3$, $Na_3AlO_3$, $Na_3CaO_3$ and $Na_3InO_3$ can be given.

In addition to the above-mentioned raw materials (A) to (D), elemental phosphorus (P), elemental phosphorus (S), silicon (Si), $LiBO_2$ (lithium metaborate), $LiAlO_3$ (lithium aluminate), $NaBO_2$ (sodium metaborate), $NaAlO_3$ (sodium aluminate), $POCl_3$, $POBr_3$ or the like can also be used.

Regarding the mixing ratio of the above-mentioned raw materials, the molar ratio of the raw material (A) and the raw material (B) is 60:40 to 90:10, preferably (A):(B)=68:32 to 80:20 (molar ratio), more preferably (A):(B)=73:27 to 76:24, and further preferably (A):(B)=74:26 to 76:24. In this mixing range, a solid electrolyte having a high ionic conductivity and having resistance to hydrolysis tends to be obtained easily.

Most preferably, the component (A) is lithium sulfide and the component (B) is phosphorus pentasulfide.

The ratio of the molar amount of the raw material (C) relative to the total molar amounts of the raw materials (A) and (B) [(A)+(B):(C)] is preferably 50:50 to 99:1 (molar ratio), more preferably 80:20 to 98:2 (molar ratio), further preferably 85:15 to 98:2 (molar ratio) and particularly preferably 90:10 to 98:2.

The mixing amount of the raw material (D) (vitrification accelerator) is preferably 1 to 10 mol %, particularly preferably 1 to 5 mol %, relative to the total of the raw materials (A), (B) and (C).

The raw materials of the solid electrolyte glass obtained in the invention may essentially consist of the raw materials (A) to (C) and, optionally, the raw material (D). Alternatively, the raw materials of the solid electrolyte may be obtained by using only these components.

The "essentially consist of" means that the raw materials are mainly formed of the above-mentioned raw materials (A) to (C), and optionally the raw material (D). For example, it means that the raw materials (A) to (D) are used in an amount of 95 wt % or more or 98 wt % or more.

In the production method of the invention, the raw materials (A) to (C), and optionally the raw material (D) and other components such as elemental phosphorus are brought into contact with each other in a solvent (modifier) having a solubility parameter of 9.0 or more. By using a solvent having a solubility parameter of 9.0 or more, the raw materials tend to be dissolved easily, and a solid electrolyte can be produced efficiently without using a mill or the like. The solubility parameter of a solvent is preferably 9 to 20, with 9 to 15 being particularly preferable.

The solubility parameter (SP value) is a value obtained by referring to the Polymer Data Handbook (edited by the Society of Polymer Science), Adhesive Handbook (fourth edition, edited by Nikkan Kogyo Shimbun, Ltd.), Advanced Edition of Chemical Handbook (revised third version), published by Maruzen Corporation.

The solvent having a solubility parameter of 9.0 or more is preferably a solvent having one or more polar groups selected from a hydroxyl group, a carboxyl group, a nitrile group, an amino group, an amide bond, a nitro group, a —C(=S)-bond, an either (—O—) bond, a —Si—O—bond, a ketone (—C(=O)—) bond, an ester (—C(=O)—O—) bond, a carbonate (—O—C(=O)—O—) bond, a —S(=O)— bond, chloro and fluoro.

As the polar solvent containing one polar group, methanol (14.5) (numbers in parentheses indicate solubility parameters. The same can be applied to the following), ethanol (12.7), n-propanol, isopropanol (11.5), n-butanol, isobutanol, n-pentanol, ethylene glycol (14.2), formic acid (13.5), acetic acid (12.6), acetonitrile (11.9), propionitrile, malononitrile, succinonitrile, fumaronitrile, trimethylsilyl cyanide, N-methylpyrrolidone, triethylamine, pyridine, dimethylformamide (12.0), dimethylacetamide, nitromethane, carbon disulfide, diethyl ether, diisopropyl ether, t-butyl methyl ether, phenyl methyl ether, dimethoxymethane, diethoxyethane, tetrahydrofuran (THF: 9.1), dioxane, trimethylmethoxysilane, dimethyldimethoxysilane, tetramethoxysilane, tetraethoxysilane, cyclohexylmethyldimethoxysilane, acetone (10.0), methyl ethyl ketone, acetaldehyde, ethyl acetate (9.0), acetic anhydride, methylene carbonate, propylene carbonate, dimethyl carbonate, methyl ethyl carbonate, dimethyl sulfoxide, methylene chloride, chloroform, dichloroethane, dichlorobenzene, hexafluoro benzene, trifluoromethyl benzene, cyclohexanone or the like can be given.

As the polar solvent containing two polar groups, 2,2,2-trifluoroethanol, hexafluoro isopropanol, 2-aminoethanol, chloroacetic acid, trifluoroacetic acid, methoxy propionitrile, 3-ethoxy propionitrile, methyl cyanoacetate, difluoroacetonitrile or the like can be given.

In the invention, a solvent having an ether (—O—) bond is preferable. A cyclic ether is further preferable, with THF being more preferable.

As the solvent having an ether (—O—) bond, a solvent having one ether (—O—) bond can be given. For example, the solvent is a solvent represented by the following formula (E):

$$R_1-O-R_2 \quad (E)$$

($R_1$ and $R_2$ are independently a hydrocarbon group including 1 to 6 carbon atoms, and $R_1$ and $R_2$ may be bonded with each other to form a ring)

As the hydrocarbon group, an alkyl group is preferable. When $R_1$ and $R_2$ are bonded to form a ring, it is preferred that the bond formed by $R_1$ and $R_2$ be an alkylene group.

The hydrocarbon group may be branched or may not necessarily be branched.

It is preferred that the hydrocarbon group have 2 to 5 carbon atoms.

It is preferred that $R_1$ and $R_2$ be bonded to form a ring.

At the time of production, a solvent having a solubility parameter of less than 9.0 may be mixed in the solvent. As the solvent having a solubility parameter of less than 9.0, hexane (7.3), heptane, octane, decane, cyclohexane, ethyl cyclohexane, methyl cyclohexane, toluene (8.8), xylene (8.8), ethylbenzene, Ipsole 100 (manufactured by Idemitsu Kosan Co., Ltd.), Ipsole 150 (manufactured by Idemitsu Kosan Co., Ltd.), IP Solvent (manufactured by Idemitsu Kosan Co., Ltd.), liquid paraffin, petroleum ether, cyclopentyl methyl ether or the like can be given.

The amount ratio of the solvent having a solubility parameter of 9.0 or more and a solvent having a solubility parameter of less than 9.0 is not particularly restricted. For example, the amount ratio of the solvent having a solubility parameter of less than 9.0 is 1 wt % or more and 40 wt % or less relative to the total of the solvent having a solubility parameter of 9.0 or more and the solvent having a solubility parameter of less than 9.0, for example.

The solvent having a solubility parameter of 9.0 or more and the solvent having a solubility parameter of less than 9.0 are not required to be dehydrated. However, since the amount of an alkali hydroxide metal in a finely-granulated product that is formed as a side-product may be affected by the water content, the water content is preferably 50 ppm or less, more preferably 30 ppm or less.

Further, the boiling point of the solvent is preferably 65 to 200° C. If the boiling point is low, the vapor pressure at a reaction temperature is high, and as a result, a pressure-resistant container may become required. If the boiling point is high, a heavy burden is imposed when a solvent is removed by evaporation from the formed solid electrolyte.

As the solvent having a boiling point of 65 to 200° C., ethanol, n-propanol, isopropanol, n-butanol, isobutanol, n-pentanol, ethylene glycol, formic acid, acetic acid, acetonitrile, propionitrile, malononitrile, fumarononitrile, trimethylsilyl cyanide, triethylamine, pyridine, dimethylformamide, dimethylacetoamide, nitromethane, diisopropyl ether, phenyl methyl ether, diethoxy ethane, THF, dioxane, dimethyl dimethoxysilane, tetramethoxysilane, tetraethoxysilane, methyl ethyl ketone, ethyl acetate, acetic anhydride, dimethyl sulfoxide, dichloroethane, dichlorobenzene, hexafluoro benzene, trifluoromethyl benzene, trifluoroethanol, aminoethanol, chloroacetic acid, trifluoroacetic acid, methoxypropionitrile, ethoxypropionitrile, methyl cyanoacetate, difluoro acetonitrile, glyme, dimethyl carbonate, methyl ethyl carbonate, cyclohexanone, cyclopentylmethyl ether can be given.

As for the conditions under which the raw materials are brought into contact with each other in the solvent, the temperature is preferably 20 to 200° C., with 50 to 150° C. being particularly preferable.

The time is preferably 1 to 40 hours, more preferably 1 to 20 hours, and particularly preferably 2 to 15 hours.

The amount of the solvent is such that it allows the raw materials to be in the state of a solution or slurry by the addition of a solvent. Normally, the amount added of the raw materials (total amount) per liter of the solvent is about 0.001 to 1 kg, preferably 0.005 to 0.5 kg, and particularly preferably 0.01 to 0.3 kg.

The method for bringing the raw materials into contact with each other is not particularly restricted. For example, known apparatuses such as a reaction container provided with a stirrer and various mills can be used. In the production method of the invention, a solid electrolyte can be produced efficiently without using a special mixing and grinding apparatus such as a beads mill. However, the above-mentioned apparatuses may be used according to need.

EXAMPLES

Production Example 1 [Production of Lithium Sulfide]

Under the flow of nitrogen, 270 g of toluene as a non-polar solvent was placed in a 600 ml-separable flask. Then, 30 g of lithium hydroxide (manufactured by Honjo Chemical Corporation) was placed. While stirring by means of a full-zone stirring blade at 300 rpm, the resulting slurry was retained at 95° C. While blowing hydrogen sulfide at a supply speed of 300 ml/min into the slurry, the slurry was heated to 104° C. From the separable flask, an azeotropic gas of water and toluene was continuously discharged. This azeotropic gas was dehydrated by condensing by a condenser outside the system. During that period, toluene in an amount similar to that of the toluene that was distilled off was continuously supplied, whereby the reaction liquid level was kept at constant.

The amount of the water in the condensed liquid was gradually decreased. After the lapse of 6 hours from the start of the introduction of hydrogen sulfide, distillation off of water was no longer observed (the water content was 22 ml in total). During the reaction, the solids were in the state that they were dispersed and stirred in the toluene, and no water phase was separated from the toluene. Thereafter, the hydrogen sulfide was changed to nitrogen, and the nitrogen was flown at a speed of 300 ml/min for one hour. The solid matters were filtrated and dried to obtain lithium sulfide as white powder.

The resulting powder was analyzed by titration with hydrochloric acid and titration with silver nitrate. As a result, it was found that the purity of lithium sulfide was 99.0%. Further, as a result of an X-ray diffraction measurement, it was confirmed that a peak derived from other than the crystal patterns of lithium sulfide was not detected. The average particle size was 450 µm (slurry solution).

The particle size of lithium sulfide was measured by the laser diffraction method by means of Mastersizer 2000 (manufactured by Malvern Instruments Ltd.), and calculated from the volume based average particle diameter.

The specific surface area of the resulting lithium sulfide was measured by the BET method with a nitrogen gas by means of AUTOSORB 6 (manufactured by Sysmex Corporation), and found to be 14.8 $m^2/g$. The fine pore volume was measured by using the same apparatus as that for measuring the specific surface area, and obtained by interpolating to 0.99 from a measuring point at which the relative pressure ($P/P_0$) is 0.99 or more. The fine pore volume was found to be 0.15 ml/g.

Production Example 2 [Pulverization Treatment]

26 g of lithium sulfide obtained in Production Example 1 was weighed in a Schlenk bottle in a globe box. In the atmosphere of nitrogen, 500 ml of dehydrated toluene (manufactured by Wako Pure Chemical Industries, Ltd.) and 250 ml of dehydrated ethanol (manufactured by Wako Pure Chemical Industries, Ltd.) were added in this sequence, and the resultant was stirred by means of a stirrer at room temperature for 24 hours. After the modification treatment, the bath temperature was raised to 120° C., and a hydrogen sulfide gas was flown at a rate of 200 ml/min for 90 minutes, thereby to conduct a treatment. After the treatment with the hydrogen sulfide gas, the solvent was distilled off at room temperature in the flow of nitrogen. Further, under vacuum, drying was conducted at room temperature for 2 hours, whereby pulverized lithium sulfide was recovered.

Pulverized lithium sulfide was evaluated in the same manner as in Production Example 1. Lithium sulfide had a purity of 97.2%, lithium hydroxide content of 0.3%, an average particle size of 9.1 µm (undried slurry solution), a specific surface area of 43.2 $m^2/g$ and a fine pore volume of 0.68 ml/g. The purity and the lithium hydroxide content were respectively quantified by the titration method. The reason that the total of the analyzed values did not become 100% is that lithium sulfide contained lithium carbonate, other ionic salts or a remaining solvent.

Example 1

The inside of the flask with a stirrer was replaced with nitrogen. Then, 3.37 g of lithium sulfide produced in Production Example 2 (taking the purity into consideration, 3.27 g thereof was lithium sulfide), 5.32 g of phosphorus pentasulfide (manufactured by Sigma-Aldrich Japan) and 1.41 g of LiBr (manufactured by Sigma-Aldrich Japan) and 125 ml of tetrahydrofuran (having a water content of 10 ppm) (THF: manufactured by Wako Pure Chemical Industries, Inc.) were placed in the flask, and they were brought into contact with each other at 140° C. for 24 hours. The solubility parameter of THF was 9.1.

The solid components were separated by filtration, and then vacuum-dried at 120° C. for 40 minutes, whereby a solid electrolyte was produced. The resulting solid electrolyte had an ionic conductivity of $2.5 \times 10^4$ S/cm. As a result of an X-ray diffraction measurement (CuKα:λ=1.5418 Å), no peak other than a hallow pattern derived from an amorphous product was observed, and it was confirmed that the resulting product was solid electrolyte glass.

The ionic conductivity was measured by the following method.

The solid electrolyte was placed in a tablet forming machine, and a pressure of 10 MPa was applied to obtain a formed product. Further, as an electrode, a mix obtained by mixing the carbon and the solid electrolyte at a weight ratio of 1:1 was put on the both sides of the formed product, and a pressure was again applied by the tablet forming machine, whereby a formed product (diameter: about 10 mm, thickness: about 1 mm) was produced. For this formed product, the ionic conductivity was measured by an AC impedance method. As the value of conductivity, a numerical value at 25° C. was used.

Example 2

The inside of the flask with a stirrer was replaced with nitrogen. Then, 1.0 g of lithium sulfide produced in Production Example 2 (taking the purity into consideration, 0.97 g thereof was lithium sulfide), 1.65 g of phosphorus pentasulfide (manufactured by Sigma-Aldrich Japan) and 0.44 g of LiBr (manufactured by Sigma-Aldrich Japan) and 30 ml of tetrahydrofuran (having a water content of 10 ppm) (THF: manufactured by Wako Pure Chemical Industries, Inc.) were placed in the flask, and they were allowed to react at room temperature for 20 hours. After completion of the reaction, THF was removed by drying at room temperature under reduced pressure, followed by further drying at 80° C. for 1 hour. The resulting solid electrolyte had an ionic conductivity of $0.17 \times 10^4$ S/cm. As a result of an X-ray diffraction measurement (CuKα:λ=1.5418 Å), no peak other than a hallow pattern derived from an amorphous product was observed, and it was confirmed that the resulting product was solid electrolyte glass.

The resulting solid electrolyte glass was subjected to vacuum heat treatment at 140° C. for 2 hours, whereby a solid electrolyte was produced. The resulting solid electrolyte had an ionic conductivity of $7.9 \times 10^4$ S/cm. As a result of an X-ray diffraction analysis (CuKα:λ=1.5418 Å) of this solid electrolyte, a peak derived from Thio-LISICON Region II crystals was observed.

The ionic conductivity was measured in the same manner as in Example 1.

Example 3

The inside of the flask with a stirrer was replaced with nitrogen. Then, 1.0 g of lithium sulfide produced in Production Example 2 (taking the purity into consideration, 0.97 g thereof was lithium sulfide), 1.65 g of phosphorus pentasulfide (manufactured by Sigma-Aldrich Japan) and 0.63 g of LiBr (manufactured by Sigma-Aldrich Japan) and 30 ml of tetrahydrofuran (having a water content of 10 ppm) (THF: manufactured by Wako Pure Chemical Industries, Inc.) were placed in the flask, and they were allowed to react at room temperature for 20 hours. After completion of the reaction, THF was removed by drying at room temperature under reduced pressure, followed by further drying at 80° C. for 1 hour. The resulting solid electrolyte had an ionic conductivity of $0.07 \times 10^{-4}$ S/cm. As a result of an X-ray diffraction measurement (CuKα:λ=1.5418 Å), no peak other than a hallow pattern derived from an amorphous product was observed, and it was confirmed that the resulting product was solid electrolyte glass.

The resulting solid electrolyte glass was subjected to vacuum heat treatment at 140° C. for 2 hours, whereby a solid electrolyte was produced. The resulting solid electrolyte had an ionic conductivity of $3.9 \times 10^{-4}$ S/cm. As a result of an X-ray diffraction analysis (CuKα:λ=1.5418 Å) of this solid electrolyte, a peak derived from Thio-LISICON Region II crystals was observed.

The ionic conductivity was measured in the same manner as in Example 1.

Example 4

The inside of the flask with a stirrer was replaced with nitrogen. Then, 1.0 g of lithium sulfide produced in Production Example 2 (taking the purity into consideration, 0.97 g thereof was lithium sulfide), 1.65 g of phosphorus pentasulfide (manufactured by Sigma-Aldrich Japan) and 0.51 g of LiBr (manufactured by Sigma-Aldrich Japan) and 30 ml of tetrahydrofuran (having a water content of 10 ppm) (THF: manufactured by Wako Pure Chemical Industries, Inc.) were placed in the flask, and they were allowed to react at room temperature for 20 hours. After completion of the reaction, THF was removed by drying at room temperature under reduced pressure, followed by further drying at 80° C. for 1 hour. The resulting solid electrolyte had an ionic conductivity of $0.08 \times 10^{-4}$ S/cm. As a result of an X-ray diffraction measurement (CuKα:λ=1.5418 Å), no peak other than a hallow pattern derived from an amorphous product was observed, and it was confirmed that the resulting product was solid electrolyte glass.

The resulting solid electrolyte glass was subjected to vacuum heat treatment at 140° C. for 2 hours, whereby a solid electrolyte was produced. The resulting solid electrolyte had an ionic conductivity of $4 \times 10^{-4}$ S/cm. As a result of an X-ray diffraction analysis (CuKα:λ=1.5418 Å) of this solid electrolyte, a peak derived from Thio-LISICON Region II crystals was observed.

The ionic conductivity was measured in the same manner as in Example 1.

Example 5

A solid electrolyte was produced in the same manner as in Example 2, except that the temperature of the vacuum heat treatment of the solid electrolyte glass was changed from 140° C. to 120° C. The ionic conductivity of the solid electrolyte obtained by the vacuum heat treatment was $3.6 \times 10^4$ S/cm. As a result of an X-ray diffraction analysis (CuKα:λ=1.5418 Å) of this solid electrolyte, a peak derived from Thio-LISICON Region II crystals was observed.

The ionic conductivity was measured in the same manner as in Example 1.

Example 6

A solid electrolyte was produced in the same manner as in Example 2, except that the temperature of the vacuum heat treatment was changed from 140° C. to 160° C. The ionic conductivity of the solid electrolyte obtained by the vacuum heat treatment was $9.4 \times 10^{-4}$ S/cm. As a result of an X-ray diffraction analysis (CuKα:λ=1.5418 Å) of this solid electrolyte, a peak derived from Thio-LISICON Region II crystals was observed.

The ionic conductivity was measured in the same manner as in Example 1.

Comparative Example 1

The inside of the flask with a stirrer was replaced with nitrogen. Then, 1.2 g of lithium sulfide produced in Production Example 2 (taking the purity into consideration, 1.17 g thereof was lithium sulfide), 1.88 g of phosphorus pentasulfide (manufactured by Sigma-Aldrich Japan) and 30 ml of tetrahydrofuran (having a water content of 10 ppm) (THF: manufactured by Wako Pure Chemical Industries, Inc.) were placed in the flask, and they were allowed to react at room temperature for 20 hours. After completion of the reaction, solid matters were separated by filtration. Thereafter, THF was further added, followed by stirring for 10 minutes, and then the solid matters were filtrated. This operation was repeated three times. THF was removed by drying at room temperature under reduced pressure, followed by further drying at 80° C. for 1 hour.

The resulting solid electrolyte glass was subjected to vacuum heat treatment at 140° C. for 2 hours, whereby a solid electrolyte was produced. The resulting solid electrolyte had an ionic conductivity of $1.2 \times 10^4$ S/cm. As a result of an X-ray diffraction analysis (CuKα:λ=1.5418 Å) of this solid electrolyte, a peak derived from Thio-LISICON Region III crystals was observed.

The ionic conductivity was measured in the same manner as in Example 1.

The reason for the fact that the solid electrolytes of Examples 2 to 4 had a lower conductivity as compared with that of the solid electrolyte in Example 1 is assumed to be as follows. THF tends to remain easily by adding LiBr in addition to lithium sulfide and phosphorus pentasulfide, and a larger amount of THF remains due to a low drying temperature after the synthesis of the solid electrolyte (the former was 120° C. and the latter was 80° C.).

INDUSTRIAL APPLICABILITY

The production method of the invention is preferable as a method for producing a sulfide-based solid electrolyte.

Although only some exemplary embodiments and/or examples of this invention have been described in detail above, those skilled in the art will readily appreciate that many modifications are possible in the exemplary embodiments and/or examples without materially departing from the novel teachings and advantages of this invention. Accordingly, all such modifications are intended to be included within the scope of this invention.

The Japanese application specification claiming priority under the Paris Convention are incorporated herein by reference in its entirety.

The invention claimed is:

1. A method for producing a solid electrolyte, comprising contacting the following (i), (ii) and (iii) with each other in a solvent having a solubility parameter of 9.0 or more without using a mixing and grinding apparatus:
   (i) an alkali metal sulfide;
   (ii) one or more sulfur compounds selected from the group consisting of phosphorus sulfide, germanium sulfide, silicon sulfide and boron sulfide; and
   (iii) a halogen compound.

2. The method of claim 1, wherein the solvent is an ether.

3. The method of claim 2, wherein a boiling point of the solvent is 65 to 200° C.

4. The method of claim 2, wherein the alkali metal sulfide has a particle size of 100 μm or less.

5. The method of claim 2, wherein the alkali metal sulfide is lithium sulfide ($Li_2S$) and the sulfur compound is phosphorus pentasulfide ($P_2S_5$), and a mixing ratio of $Li_2S$ and $P_2S_5$ ($Li_2S:P_2S_5$) is in a range of 74:26 to 76:24 in terms of molar ratio.

6. The method of claim 5, wherein the halogen compound is a bromine compound.

7. The method of claim 2, wherein the contacting is performed at a temperature of 20 to 200° C. and the contacting is performed for a time of 1 to 40 hours.

8. The method of claim 1, wherein a boiling point of the solvent is 65 to 200° C.

9. The method of claim 1, wherein the alkali metal sulfide has a particle size of 100 μm or less.

10. The method of claim 1, wherein the alkali metal sulfide is lithium sulfide ($Li_2S$) and the sulfur compound comprises phosphorus sulfide.

11. The method of claim 10, wherein the halogen compound is a bromine compound.

12. The method of claim 11, wherein the solvent is an ether.

13. The method of claim 12, wherein the contacting is performed at a temperature of 20 to 200° C. and the contacting is performed for a time of 1 to 40 hours.

14. The method of claim 10, wherein the halogen compound is LiBr or $PBr_3$.

15. The method of claim 1, wherein said contacting produces a solid electrolyte in which no raw materials are present.

16. The method of claim 1, wherein the alkali metal sulfide is lithium sulfide ($Li_2S$) and the sulfur compound is phosphorus pentasulfide ($P_2S_5$), and a mixing ratio of $Li_2S$ and $P_2S_5$ ($Li_2S:P_2S_5$) is in a range of 68:32 to 80:20 in terms of molar ratio.

17. The method of claim 16, wherein the mixing ratio of $Li_2S$ and $P_2S_5$ is in a range of 74:26 to 76:24 in terms of molar ratio.

18. A method for producing a solid electrolyte, comprising contacting the following (i), (ii) and (iii) with each other in tetrahydrofuran without using a mixing and grinding apparatus:
   (i) an alkali metal sulfide;
   (ii) one or more sulfur compounds selected from the group consisting of phosphorus sulfide, germanium sulfide, silicon sulfide and boron sulfide; and
   (iii) a halogen compound.

19. The method of claim 18, wherein said contacting produces a solid electrolyte in which no raw materials are present.

20. A method for producing a solid electrolyte, comprising contacting the following (i), (ii) and (iii) with each other in an ether of the formula $R_1$—O—$R_2$ where $R_1$ and $R_2$ are independently $C_1$-$C_6$ alkyl groups without using a mixing and grinding apparatus:
   (i) an alkali metal sulfide;
   (ii) one or more sulfur compounds selected from the group consisting of phosphorus sulfide, germanium sulfide, silicon sulfide and boron sulfide; and
   (iii) a halogen compound.

21. The method of claim 20, wherein the alkali metal sulfide has a particle size of 100 μm or less.

22. The method of claim 20, wherein the alkali metal sulfide is lithium sulfide ($Li_2S$), the sulfur compound is phosphorus pentasulfide ($P_2S_5$), and a mixing ratio of $Li_2S$ and $P_2S_5$ ($Li_2S:P_2S_5$) is in a range of 74:26 to 76:24 in terms of molar ratio, and the halogen compound is a bromine compound.

23. The method of claim 20, wherein said contacting produces a solid electrolyte in which no raw materials are present.

* * * * *